US008605432B2

(12) United States Patent
Ting

(10) Patent No.: US 8,605,432 B2
(45) Date of Patent: Dec. 10, 2013

(54) PORTABLE ELECTRONIC DEVICE

(75) Inventor: Yu-Chen Ting, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 267 days.

(21) Appl. No.: 13/283,587

(22) Filed: Oct. 28, 2011

(65) Prior Publication Data

US 2012/0275095 A1    Nov. 1, 2012

(30) Foreign Application Priority Data

Apr. 29, 2011 (TW) .............................. 100115064 A

(51) Int. Cl.
*G06F 1/16* (2006.01)
*H04M 1/00* (2006.01)

(52) U.S. Cl.
USPC ............ 361/679.58; 361/679.55; 361/679.56; 455/575.1

(58) Field of Classification Search
USPC ............. 361/679.01–679.45, 679.55–679.59, 361/724–727; 349/58–60; 455/575.1
See application file for complete search history.

(56) References Cited

U.S. PATENT DOCUMENTS

| | | | | |
|---|---|---|---|---|
| 5,331,506 A * | 7/1994 | Nakajima | ................ | 361/679.58 |
| 5,946,395 A * | 8/1999 | Petrella et al. | ........... | 379/433.01 |
| 6,842,333 B2 * | 1/2005 | Lee et al. | ................. | 361/679.55 |
| 7,149,306 B2 * | 12/2006 | Pan | ......................... | 379/433.01 |
| 7,274,563 B2 * | 9/2007 | Lin | .......................... | 361/679.55 |
| 7,307,846 B2 * | 12/2007 | Du | .............................. | 361/728 |
| 7,511,951 B2 * | 3/2009 | Liu et al. | ................. | 361/679.55 |
| 2003/0194974 A1 * | 10/2003 | Curtis et al. | ................ | 455/90.1 |

* cited by examiner

*Primary Examiner* — Jayprakash N Gandhi
*Assistant Examiner* — Nidhi Desai
(74) *Attorney, Agent, or Firm* — Altis Law Group, Inc.

(57) ABSTRACT

A portable electronic device includes a front frame, a rear panel attached to a rear side of the front frame, and a side cover. The front frame includes a main body and a first mating flange extending from the main body. The rear panel includes a main plate and a first flange extending from the main plate. The first flange and the first mating flange clamp each other. A gap is defined in the first flange or the first mating flange. The side cover is attached to exteriors of the first flange and the first mating flange. A clamping portion protrudes from the side cover. The clamping portion is movable in the gap between a detachable position where the clamping portion is disengageable from the gap and a lock position where the clamping portion clamps an inside portion of the first flange or the first mating flange.

16 Claims, 9 Drawing Sheets

PORTABLE ELECTRONIC DEVICE

BACKGROUND

1. Technical Field

The present disclosure relates to a portable electronic device with a tightly connected shell.

2. Description of Related Art

Portable electronic devices, such as mobile phones, tablet personal computers, for example, usually include a rear panel and a front frame. An opening is defined in the front frame for accommodating a display screen. The rear panel includes a main panel and two pairs of first flanges extending from the periphery of the main panel. The front frame includes a main body and two pairs of second flanges extending from the periphery of the main body. A number of clamps protrude from inside the first flanges. A number of concave portions are defined in the second flanges corresponding to the clamps. The clamps are engaged into the concave portions for securing the first flanges to the second flanges, thereby assembling the casing of the electronic device. However, the rear panel and the front frame cannot be tightly fastened together by the clamps.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
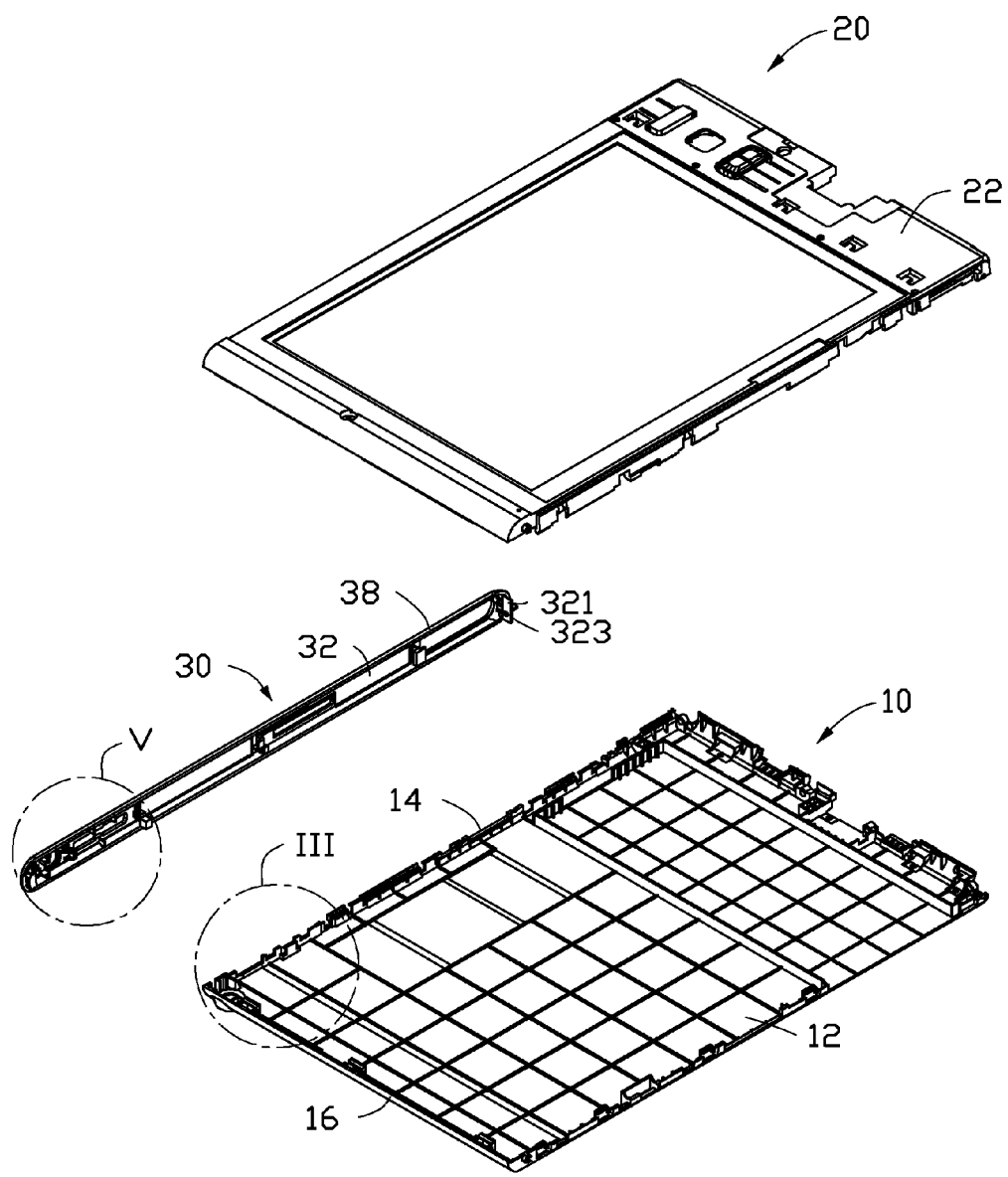
FIG. 1 is an exploded, isometric view of an embodiment of a portable electronic device.
Figure 2:
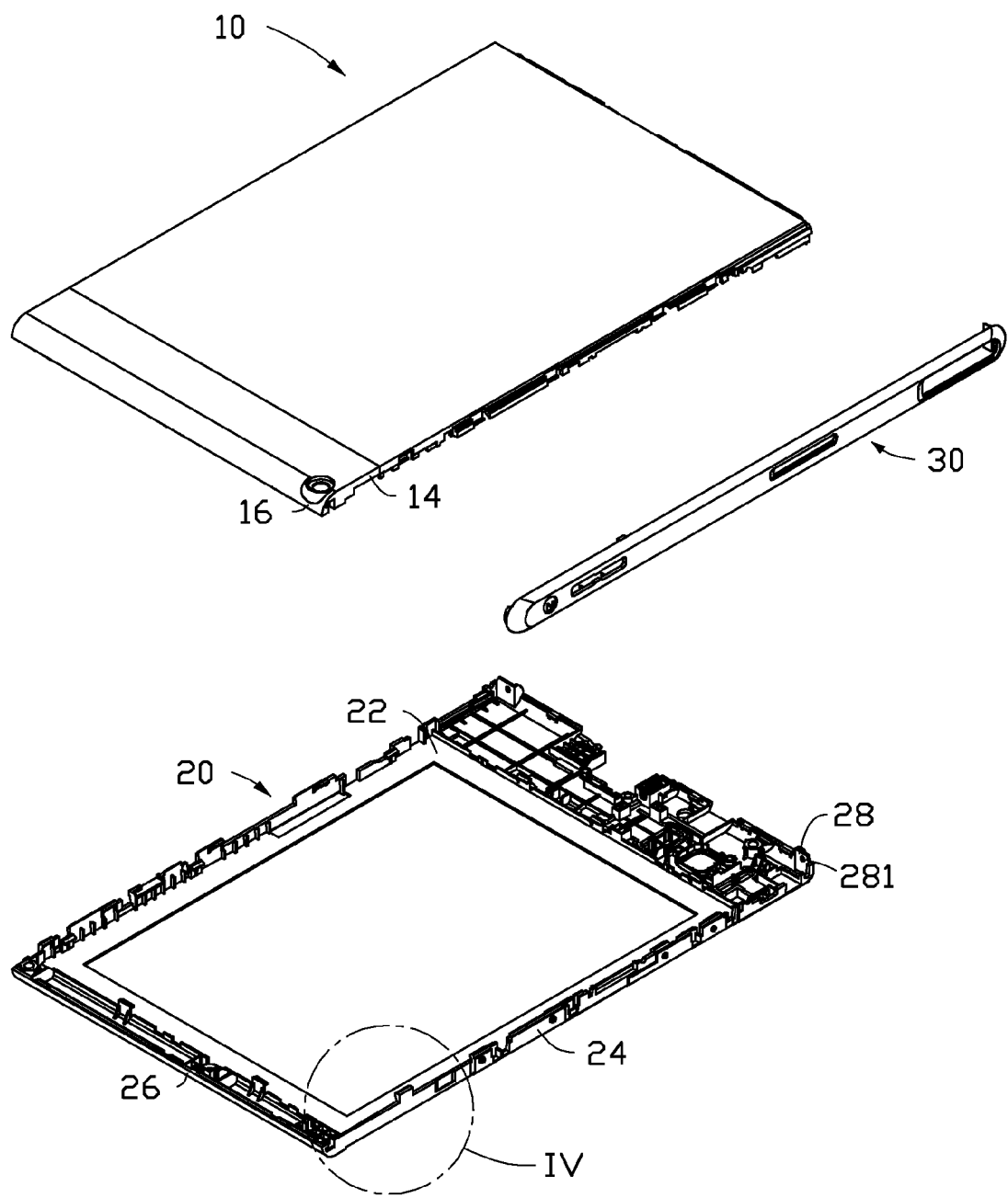
FIG. 2 is another exploded, isometric view of the portable electronic device of FIG. 1, but viewed from a different perspective.

Referring to FIGS. 1 and 2, an embodiment of a portable electronic device includes a rear panel 10, a front frame 20, and a side cover 30.

Figure 3:
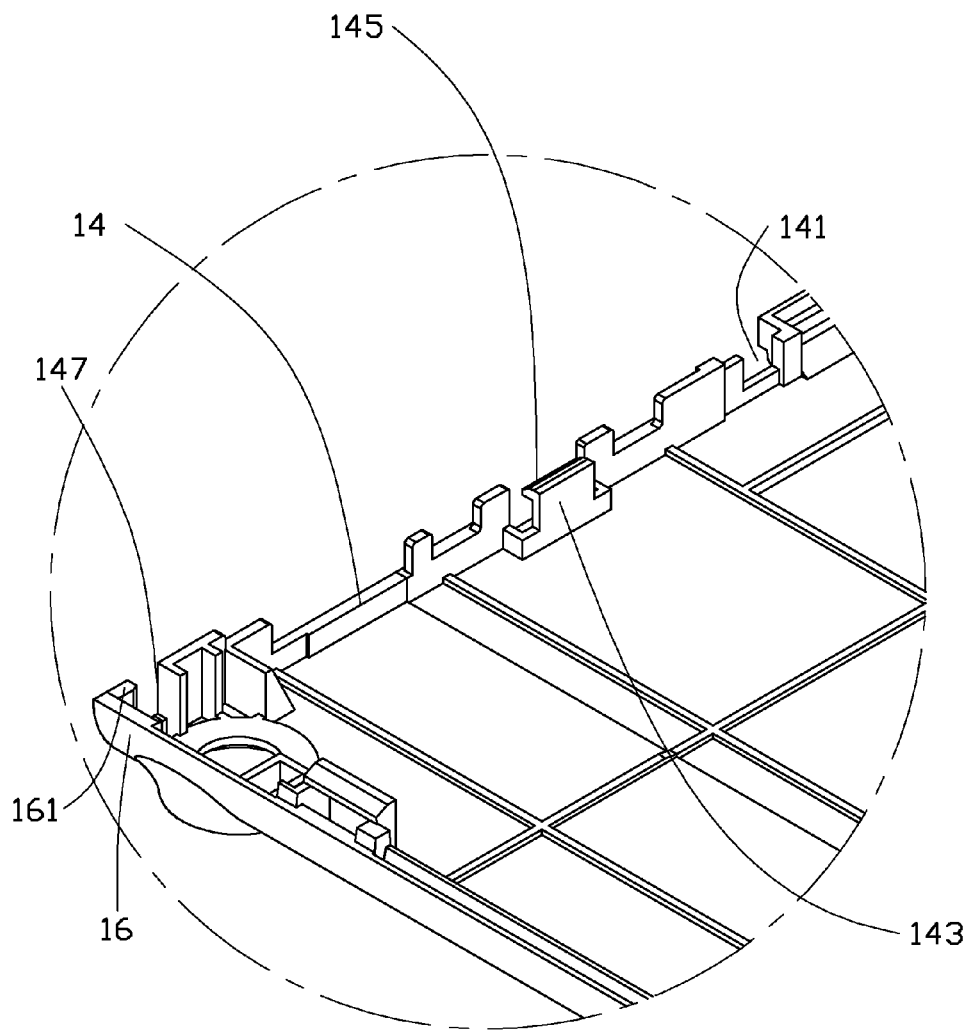
FIG. 3 is an enlarged view of the circled portion III of FIG. 1.

Referring to FIGS. 1 to 3, the rear panel 10 includes a rectangular plate 12, a first flange 14 extending inward from a long edge of the rectangular plate 12, and a second flange 16 extending inward from a short edge of the rectangular plate 12. The second flange 16 has an arc-shaped outer surface. A first gap 141 is defined in the first flange 14. A resilient tab 143 beside the first flange 14 extends substantially perpendicularly from the long edge of the rectangular plate 12. A hook portion 145 protrudes from a distal end of the resilient tab 143. A second gap 147 is defined in the first flange 14 and is located adjacent to the second flange 16. A first limiting piece 161 bends from the second flange 16 towards the second gap 147. The first limiting piece 161 is substantially perpendicular to the rectangular plate 12.

Figure 4:
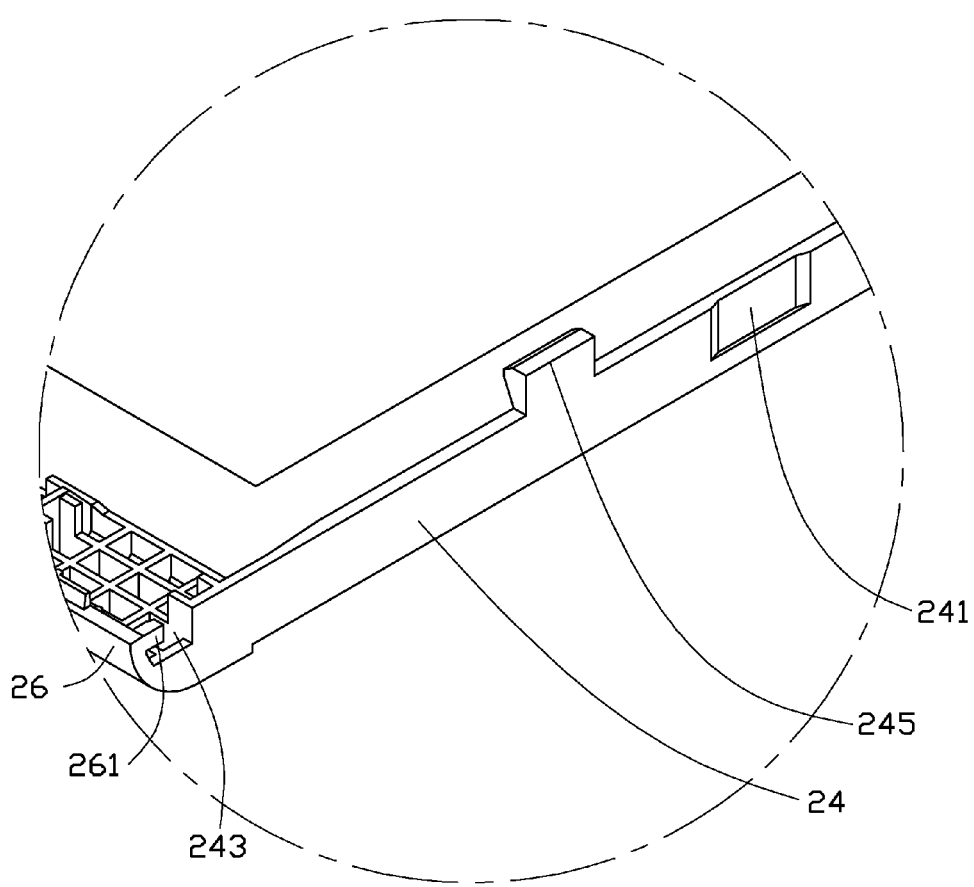
FIG. 4 is an enlarged view of the circled portion IV of FIG. 2.

Referring to FIGS. 1-2 and 4, the front frame 20 includes a rectangular main plate 22, a first mating flange 24 extending substantially perpendicularly from a long edge of the rectangular main plate 22, and a second mating flange 26 extending from a short edge of the rectangular main plate 22. The second mating flange 26 has an arc-shaped outer surface. A concave portion 241 is defined in the first mating flange 24. A third gap 243 is defined in the first mating flange 24 and located adjacent to the second mating flange 26. A second limiting piece 261 extends from the second mating flange 26 towards the third gap 243. A hook piece 245 protrudes upwards from the first mating flange 24. A concave slot (not shown) is defined in an inner side of the hook piece 245 for engaging with the hook portion 145 of the rear panel 10. A first securing piece 28 extends substantially perpendicularly from an inner side of the rectangular main plate 22. A first securing hole 281 is defined in the first securing piece 28. The first securing piece 28 is perpendicular to the first mating flange 24 and located at another short edge of the rectangular main plate 22 opposite to the second mating flange 26. A size of the front frame 20 is substantially the same as the rear panel 10. An opening is defined in the front frame 20 for accommodating a display screen.

Figure 5:
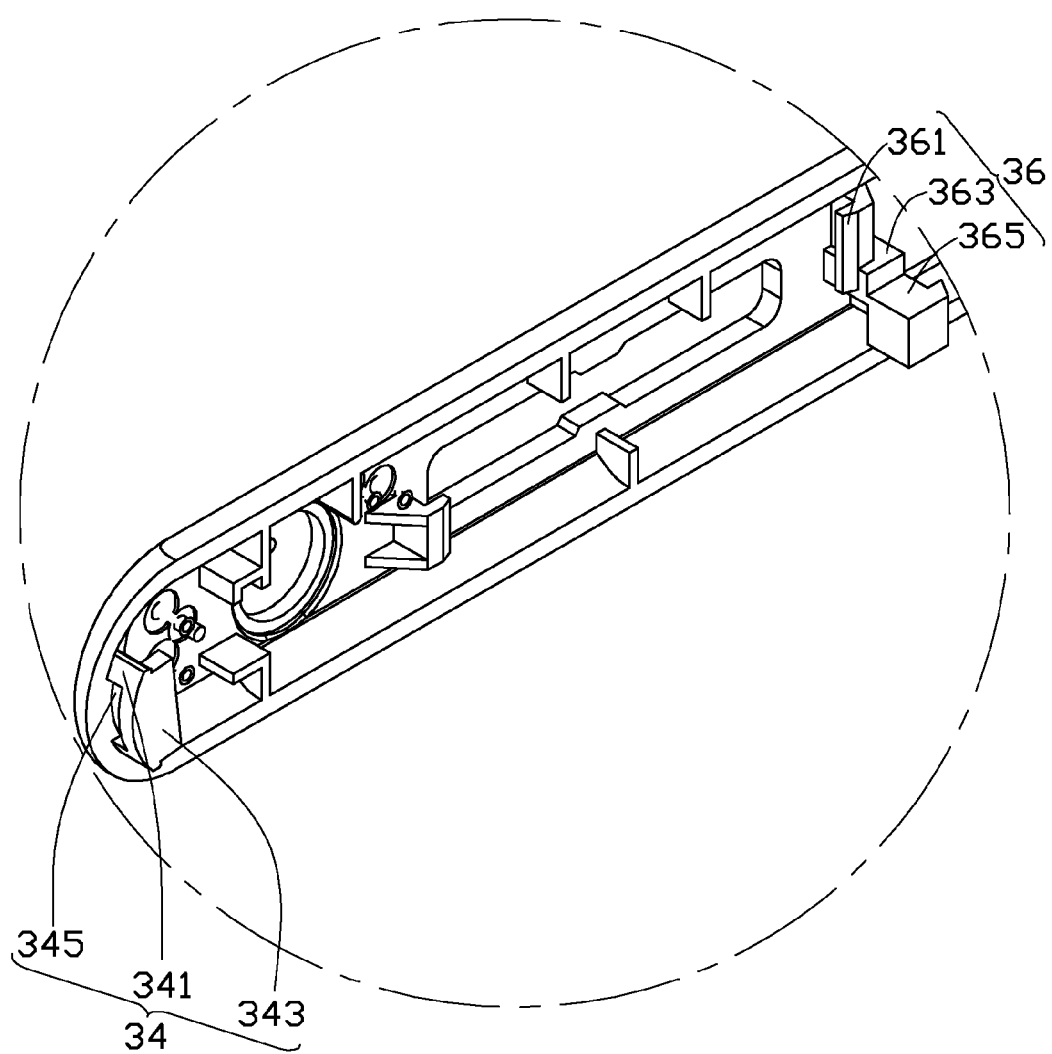
FIG. 5 is an enlarged view of the circled portion V of FIG. 1.
Figure 6:
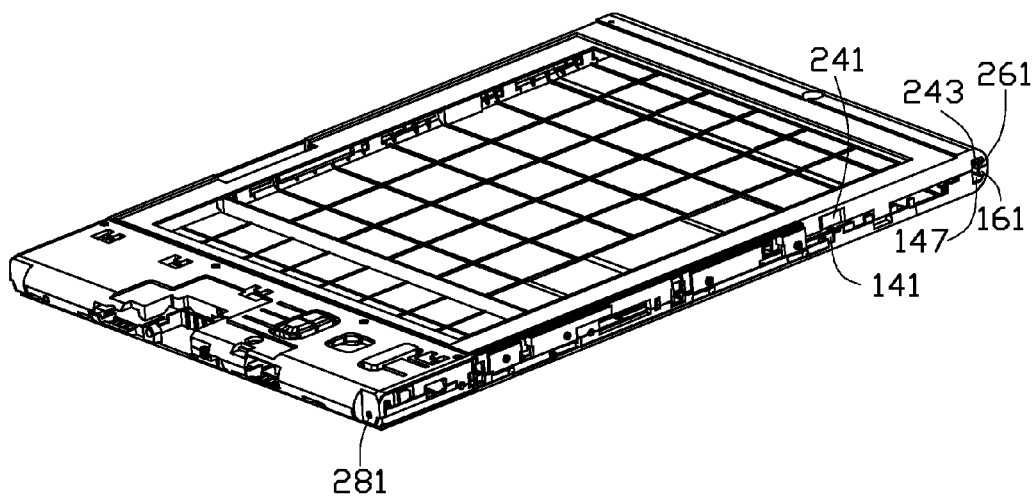
FIG. 6 is an assembled view of a rear panel and a front frame of the portable electronic device of FIG. 1.
Figure 7:
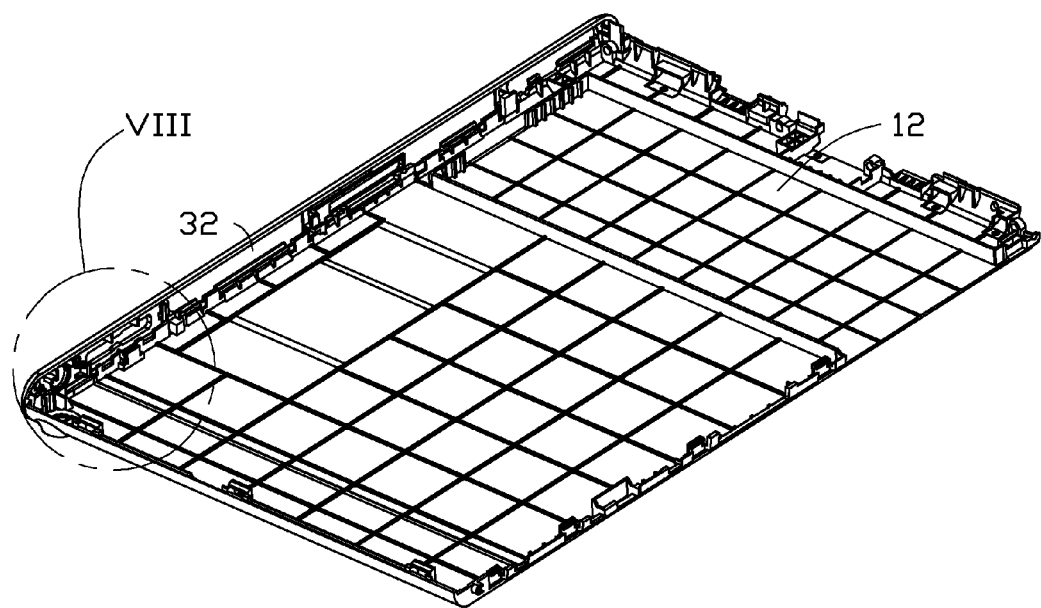
FIG. 7 is an assembled view of a rear panel and a side cover of the portable electronic device of FIG. 1.
Figure 8:
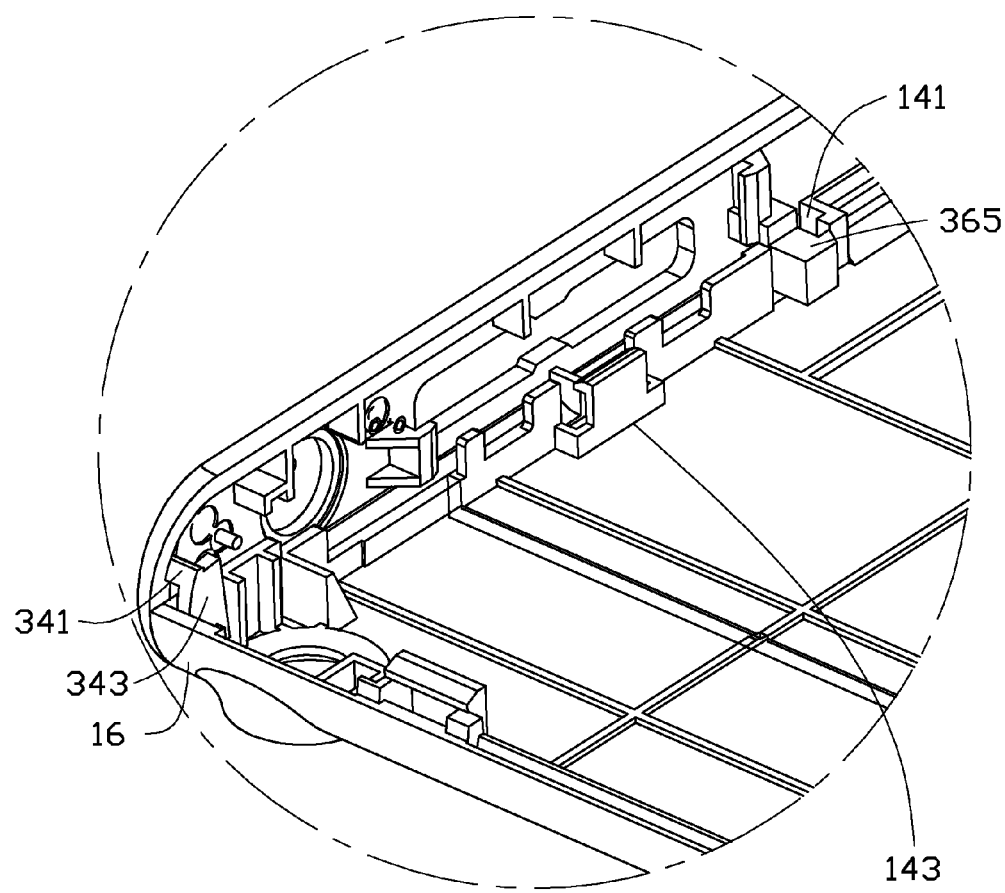
FIG. 8 is an enlarged view of the circled portion VIII of FIG. 7.
Figure 9:
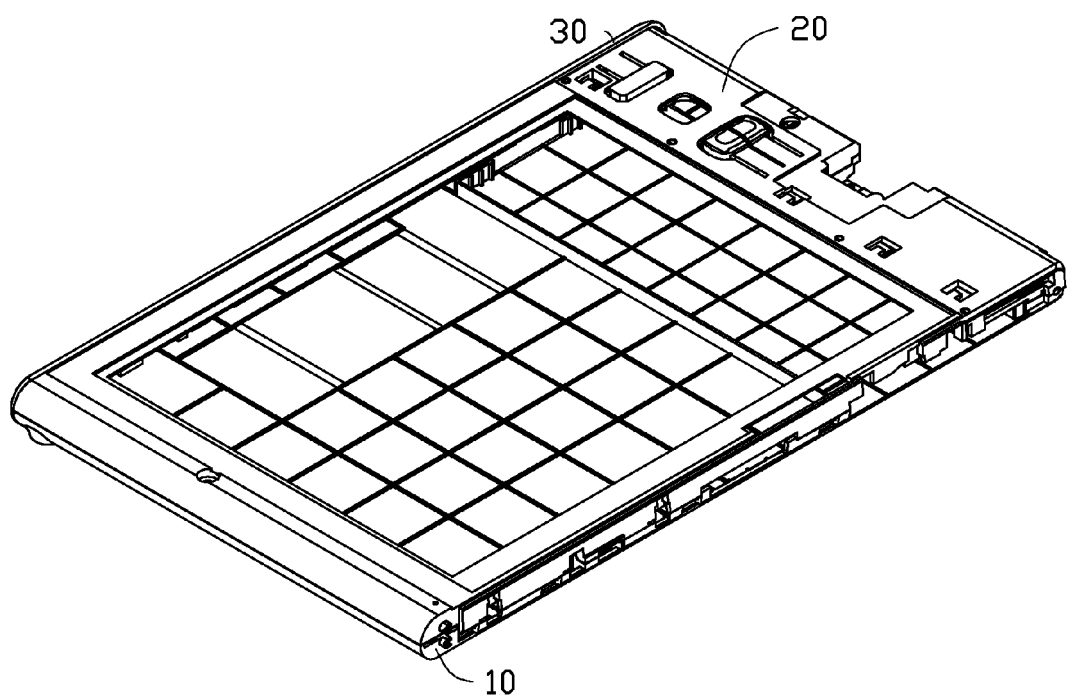
FIG. 9 is an assembled view of the portable electronic device of FIG. 1.

Referring to FIGS. 1 and 5, the side cover 30 includes a main body 32 and an arc-shaped flange 38 extending from the periphery of the main body 32. The main body 32 has a rectangular shape. A length of the main body 32 is the same as that of the rear panel 10 or the front frame 20. A second securing piece 321 extends substantially perpendicularly from a first distal end of the main body 32. A second securing hole 323 is defined in the second securing piece 321 corresponding to the first securing hole 281 of the front frame 20. An engaging portion 34 extends from a second distal end of the main body 32. The engaging portion 34 includes a first bent piece 341 extending perpendicularly from an inner side of the main body 32 and a second bent piece 343 extending perpendicularly from a distal end of the first bent piece 341. An engaging aperture 345 is defined in the first bent piece 341. A clamping portion 36 extends from the inner side of the main body 32. The clamping portion 36 includes a limiting portion 361, a resisting portion 363 connecting to a lower side of the limiting portion 361, and a clamping block 365 connecting to a rear side of the resisting portion 363. A protruding width of the resisting portion 363 is greater than that of the limiting portion 361, but less than that of the clamping block 365.

Referring to FIGS. 1-9, in assembly, the concave portion 241 is aligned with the first gap 141. The hook piece 245 abuts the hook portion 145 and urges the resilient tab 143 to be deformed until the hook portion 145 engages into the engaging slot inside the hook piece 245. Thus, the rear panel 10 is secured to the front frame 20. The first flange 14 abuts the first mating flange 24. The second flange 16 abuts the second mating flange 26. The first limiting piece 161 abuts the second limiting piece 261. The second gap 147 and the third gap 243 form an opening defined in the first flange 14 and the first mating flange 24 (see FIG. 6). The engaging portion 34 is engaged into the opening formed by the second gap 147 and the third gap 243. The limiting portion 361 is engaged in the concave portion 241. The clamping block 36 extends into the first gap 141. Then the side cover 30 is in a detachable position. To lock the side cover 30, the side cover 30 moves towards the first limiting piece 161 and the second limiting piece 261. The engaging portion 34 moves in the opening towards the first limiting piece 161 and the second limiting piece 261. The first limiting piece 161 and the second limiting piece 261 are engaged into the engaging aperture 345. The clamping block 365 moves in the first gap 141 and clamps an inside portion of the first flange 14 adjacent to the first gap 141 (see FIGS. 7 and 8). The first securing piece 28 abuts the second securing piece 321. The first securing hole 281 is aligned with the second securing hole 323. A fastener (not shown) extends into the second securing hole 323 and the first securing hole 281 to secure the side cover 30 to an outer side of the first flange 14 and first mating flange 24. Then the side cover 30 is in a locked position. The arc-shaped flange 38 abuts outer surfaces of the rear panel 10 and the front frame 20, further fastening the rear panel 10 and the front frame 20 together.

To detach the side cover 30, the fastener is removed from the first securing hole 281 and the second securing hole 323. The side cover 30 moves back to the detachable position. The first limiting piece 161 and the second limiting piece 261 are disengaged from the engaging aperture 345. The clamping block 365 disengages from the inside portion of the first flange 14. The engaging portion 34 disengages from the opening formed by the second gap 147 and the third gap 243. The clamping block 365 disengages from the first gap 141. Thus, the side cover 30 is detached from the rear panel 10 and the front frame 20.

While the present disclosure has been illustrated by the description of preferred embodiments thereof, and while the preferred embodiments have been described in considerable detail, it is not intended to restrict or in any way limit the scope of the appended claims to such details. Additional advantages and modifications within the spirit and scope of the present disclosure will readily appear to those skilled in the art. Therefore, the present disclosure is not limited to the specific details and illustrative examples shown and described.

What is claimed is:

1. A portable electronic device comprising: a front frame comprising a main body and a first mating flange extending from the main body; a rear panel, attached to a rear side of the front frame, and comprising a main plate and a first flange extending from the main plate; wherein the first flange and the first mating flange clamp each other, and a first gap is defined in the first flange or the first mating flange; and a side cover attached to exteriors of the first flange and the first mating flange, a clamping portion protruding from an inner side of the side cover and engagable with the first gap; wherein the clamping portion is movable in the first gap between a detachable position where the clamping portion disengages from the first gap and a lock position where the clamping portion engages with the first gap; wherein a concave portion is defined in the first flange or the first mating flange, and the clamping portion comprises a limiting portion engaged in the concave portion; and wherein the clamping portion further comprises a resisting portion connected to a rear side of the limiting portion and a clamping block connected to a rear side of the resisting portion, the resisting portion abuts a rear side of the first flange or the first mating flange, and the clamping block is engagable with the first gap.

2. The portable electronic device of claim 1, wherein a protruding width of the resisting portion is greater than that of the limiting portion, but less than that of the clamping block.

3. The portable electronic device of claim 1, wherein a first securing piece extends from the main body, a first securing hole is defined in the first securing piece; and a second securing piece extends from an inner side of the side cover and abuts the first securing piece, and a second securing hole is defined in the second securing piece and aligned with the first securing hole for receiving a fastener.

4. The portable electronic device of claim 3, wherein the first securing piece is substantially perpendicular to the main body and the first mating flange and located adjacent to a first short edge of the main body, and the second securing piece is located adjacent to a first distal end of the side cover.

5. The portable electronic device of claim 4, wherein the rear panel further comprises a second flange extending from a second short edge of the main plate and a first limiting piece extending substantially perpendicularly from the second flange towards the first flange; and the front frame further comprises a second mating flange extends from a short edge of the main body and a second limiting piece extending substantially perpendicularly from the second mating flange towards the first mating flange.

6. The portable electronic device of claim 5, wherein an engaging portion extends from the inner side of the side cover and is located adjacent to a second distal end of the side cover, an engaging aperture is defined in the engaging portion, and the first limiting piece and the second limiting piece are engaged in the engaging aperture in the lock position.

7. The portable electronic device of claim 6, wherein a second gap is defined in the first flange and located adjacent to the second flange, a third gap is defined in the first mating flange and located adjacent to the second mating flange, and the engaging portion is engagable into the second gap and the third gap.

8. The portable electronic device of claim 1, wherein the side cover comprises a lengthwise plate and an arc-shaped flange extending from the periphery of the lengthwise plate, the lengthwise plate abuts exteriors of the first flange and the first mating flange, and the arc-shaped flange abuts exteriors of the main body and the main plate.

9. A portable electronic device comprising: a rear panel comprising a main plate and a first flange extending from a long edge of the main plate; a first gap being defined in the first flange; and a resilient tab extending from the main plate and located adjacent to the first flange, a hook portion extending from a distal end of the resilient tab; a front frame, attached to a front side of the rear panel, and comprising a main body, a first mating flange extending from a lengthwise edge of the main body, and a hook piece protruding from the first mating flange and engaging with the hook portion; and a side cover, attached to exteriors of the first flange and the first mating flange, comprising a clamping portion protruding from an inner side of the side cover and engagable with the first gap; wherein the clamping portion is movable in the first gap between a detachable position where the clamping portion disengages from the first gap and a lock position where the clamping portion engages with the first gap; wherein a concave portion is defined in the first flange or the first mating flange, and the clamping portion comprises a limiting portion engaged in the concave portion; and wherein the clamping portion further comprises a resisting portion connected to a rear side of the limiting portion and a clamping block connected to a rear side of the resisting portion, the resisting portion abuts a rear side of the first flange or the first mating flange, and the clamping block is engagable with the first gap.

10. The portable electronic device of claim 9, wherein a protruding width of the resisting portion is greater than that of the limiting portion, but less than that of the clamping block.

11. The portable electronic device of claim 9, wherein a first securing piece extends from the main body, a first securing hole is defined in the first securing piece; and a second securing piece extends from an inner side of the side cover and abuts the first securing piece, and a second securing hole is defined in the second securing piece and aligned with the first securing hole for receiving a fastener.

12. The portable electronic device of claim 11, wherein the first securing piece is substantially perpendicular to the main body and the first mating flange and located adjacent to a first short edge of the main body, and the second securing piece is located adjacent to a first distal end of the side cover.

13. The portable electronic device of claim 12, wherein the rear panel further comprises a second flange extending from a second short edge of the main plate and a first limiting piece extending substantially perpendicularly from the second flange towards the first flange; and the front frame further comprises a second mating flange extends from a short edge of the main body and a second limiting piece extending substantially perpendicularly from the second mating flange towards the first mating flange.

14. The portable electronic device of claim 13, wherein an engaging portion extends from the inner side of the side cover and is located adjacent to a second distal end of the side cover, an engaging aperture is defined in the engaging portion, and the first limiting piece and the second limiting piece are engaged in the engaging aperture in the lock position.

15. The portable electronic device of claim 14, wherein a second gap is defined in the first flange and located adjacent to the second flange, a third gap is defined in the first mating flange and located adjacent to the second mating flange, and the engaging portion is engageable into the second gap and the third gap.

16. The portable electronic device of claim 9, wherein the side cover comprises a lengthwise plate and an arc-shaped flange extending from the periphery of the lengthwise plate, the lengthwise plate abuts exteriors of the first flange and the first mating flange, and the arc-shaped flange abuts exteriors of the main body and the main plate.

* * * * *